US012752929B2

(12) United States Patent
Fledderman et al.

(10) Patent No.: US 12,752,929 B2
(45) Date of Patent: Oct. 6, 2026

(54) METHOD AND APPARATUS FOR CONDUCTING HEALTH MONITORING

(71) Applicants: Airbus Operations GmbH, Hamburg (DE); Liebherr-Aerospace Lindenberg GmbH, Lindenberg (DE)

(72) Inventors: Andreas Fledderman, Hamburg (DE); Jan Arend Van Bruggen, Hamburg (DE); Christian Kohlöffel, Lindenberg (DE); Tobias Hartmann, Lindenberg (DE); Elko Van Balen, Lindenberg (DE)

(73) Assignees: Airbus Operations GmbH, Hamburg (DE); Liebherr-Aerospace Lindenger GmbH, Lindenberg (DE)

( * ) Notice: Subject to any disclaimer, the term of this patent is extended or adjusted under 35 U.S.C. 154(b) by 189 days.

(21) Appl. No.: 18/574,434

(22) PCT Filed: Jun. 27, 2022

(86) PCT No.: PCT/EP2022/067485
§ 371 (c)(1),
(2) Date: Dec. 27, 2023

(87) PCT Pub. No.: WO2023/274914
PCT Pub. Date: Jan. 5, 2023

(65) Prior Publication Data

US 2024/0278930 A1 Aug. 22, 2024

(30) Foreign Application Priority Data

Jun. 29, 2021 (EP) .................................... 21182478

(51) Int. Cl.

| | |
|---|---|
| ***B64D 45/00*** | (2006.01) |
| ***B64C 13/38*** | (2006.01) |
| ***B64F 5/60*** | (2017.01) |

(52) U.S. Cl.
CPC .............. *B64D 45/00* (2013.01); *B64C 13/38* (2013.01); *B64F 5/60* (2017.01); *B64D 2045/0085* (2013.01)

(58) Field of Classification Search
CPC ............ B64D 45/00; B64D 2045/0085; B64C 13/38; B64C 13/40; B64C 13/50; B64F 5/60
See application file for complete search history.

(56) References Cited

U.S. PATENT DOCUMENTS

| | | | | |
|---|---|---|---|---|
| 2,665,084 A * | 1/1954 | Feeney | .................. | B64C 13/00 60/904 |
| 2010/0282899 A1 * | 11/2010 | Heintjes | ................ | B64C 13/341 244/99.2 |

(Continued)

FOREIGN PATENT DOCUMENTS

| | | |
|---|---|---|
| EP | 3037346 A1 | 6/2016 |
| EP | 3037347 A1 | 6/2016 |

(Continued)

OTHER PUBLICATIONS

International Search Report from corresponding PCT application No. PCT/EP2022/067485, mailed on Sep. 22, 2022.

*Primary Examiner* — Donald J Wallace
*Assistant Examiner* — Jalal C Coduroglu
(74) *Attorney, Agent, or Firm* — Greer, Burns & Crain, Ltd.

(57) ABSTRACT

A health monitoring method for checking a functionality of a flight control surface driving apparatus using a load sensor for sensing a load imposed on a control surface drive device by: blocking movement of the transmission device with a brake device, commanding the control surface drive device to apply a load on the blocked transmission device, and determining whether a load sensor output signal of the load sensor is within a predetermined range. Also, a flight control (Continued)

surface drive apparatus, a flight control system and an aircraft.

14 Claims, 3 Drawing Sheets

(56) References Cited

U.S. PATENT DOCUMENTS

| | | | | |
|---|---|---|---|---|
| 2012/0083345 | A1* | 4/2012 | Kleinhans | B64C 13/28 72/97 |
| 2012/0239244 | A1* | 9/2012 | Costes | B64F 5/60 701/31.9 |
| 2014/0312170 | A1* | 10/2014 | Hara | B64C 13/42 244/99.5 |
| 2016/0176539 | A1* | 6/2016 | Van Bruggen | B64C 13/341 701/33.9 |
| 2016/0176540 | A1* | 6/2016 | Fleddermann | B64D 45/00 701/33.9 |
| 2018/0319483 | A1* | 11/2018 | Mayer | B64C 9/24 |
| 2019/0152583 | A1* | 5/2019 | Harrington | B64C 9/02 |
| 2020/0198769 | A1* | 6/2020 | Miyazono | B64C 13/50 |
| 2020/0307775 | A1* | 10/2020 | Tzabari | B64C 13/341 |

FOREIGN PATENT DOCUMENTS

| | | | | |
|---|---|---|---|---|
| EP | 3398851 | A1 | 11/2018 | |
| WO | WO-2012099300 | A1 * | 7/2012 | B64C 13/40 |

* cited by examiner

METHOD AND APPARATUS FOR CONDUCTING HEALTH MONITORING

CROSS-REFERENCES TO RELATED APPLICATIONS

This application is a national phase of International Patent Application No. PCT/EP2022/067485, filed on Jun. 27, 2022, which claims the benefit of European Patent Application No. 21 182 478.4, filed on Jun. 29, 2021, the entire disclosures of which are incorporated herein by way of reference.

FIELD OF THE INVENTION

The invention relates to a health monitoring method for checking a functionality of a flight control surface driving apparatus comprising a control surface drive device for generating mechanical power for moving at least one control surface, and a transmission device for transmitting mechanical power from the control surface drive device to the at least one control surface. Further, the invention relates to a flight control surface driving apparatus comprising a control surface drive device for generating mechanical power for moving at least one control surface, and a transmission device for transmitting mechanical power from the control surface drive device to the at least one control surface. Further, the invention relates to a flight control system and an aircraft comprising such flight control surface driving apparatus.

BACKGROUND OF THE INVENTION

A conventional fixed-wing aircraft flight control system consists of flight control surfaces, the respective cockpit controls, connecting linkages, and the operating mechanisms to control an aircraft's direction or behaviour in flight.

Aircraft flight control surfaces are aerodynamic devices allowing a pilot to adjust and control the aircraft's flight attitude. For example, a high lift system of an aircraft includes flight control surfaces such as slats, flaps, and/or variable-sweep wings.

Conventionally, control surface drive apparatuses for driving movement of such control surfaces comprise a control surface drive device which generates the mechanical power for the movement, a transmission device for transmitting this mechanical power to the control surfaces, and a control device comprising a power control unit.

For example, typical high lift systems of commercial and military aircraft are powered by a centralized PCU mounted in the fuselage with computerized control. Commonly, the PCU is connected to transmission device including a torque shaft system which provides the mechanical power to geared actuators at the flap or slat panel drive stations. Additionally, a braking device, especially comprising a wing tip brake (WTP) in each wing, may be an integrated part of the transmission device.

The WTB is capable to arrest and hold the system in failure cases. First and second independent slat flap computers (SFCC) control and monitor the system. Common PCUs have first and second independent motors which are connected by a speed summing differential gear (DIFG). Each motor is provided with a power-off brake (POB) to arrest the motor in the commanded position. Depending on the aircraft power supply system and the availability requirements, the PCU can be purely hydraulically or electrically driven or includes each of an electric motor and a hydraulic motor (hybrid PCU). For the electric drive digitally controlled brushless DC motors are commonly used.

Motor control is usually established by a closed loop layout to maintain speed and torque command inputs. The control algorithms can be implemented in a controller (e.g. SFCC) which is provided with all required data to control the motors.

The electric motor is supplied by the aircraft electrical busbar. A motor control electronic (MCE) is interfacing with the SFCC and the aircraft electrical busbar.

The MCE converts the electric power as required for the brushless DC motor and provides motor control. It is also possible that the control algorithm is implemented in the MCE. In this case the SFCC provides corresponding drive states (e.g. via a data bus system).

In the default high-lift operating mode the WTBs are released and the PCU is providing the power to operate the high-lift system (HLS) with the commanded speed into any gated position.

As a result, the PCU is usually only operating for a very small time frame (starting and landing) of a flight.

Other common driving apparatuses for driving movement of at least one control surface may have first and second central linear actuators outputting a linear movement to the transmission device. The transmission device transmits this movement by a linearly movable element, e.g., of a push rod, a cable or the like to mechanical actuators of the control surface.

The invention aims to improve the driving of movement of aircraft flight control surfaces, especially of a high-lift device, in terms of long-time reliability, early detecting of wear and reduction of maintenance work.

SUMMARY OF THE INVENTION

The invention provides a health monitoring method, a flight control surface driving apparatus, a flight control system, an aircraft and a computer program in accordance with one or more embodiments described herein.

Advantageous embodiments are also described herein.

The invention provides according to one aspect thereof a health monitoring method for checking a functionality of a flight control surface driving apparatus comprising a control surface drive device for generating mechanical power for moving at least one control surface, a transmission device for transmitting mechanical power from the control surface drive device to the at least one control surface, at least one brake device for braking movement of the transmission device, at least one load sensor for sensing a load imposed on the control surface drive device, and a control device configured to receive a load sensor output signal from the at least one load sensor and to control the control surface drive device in response to the load sensor output signal, wherein the health monitoring method comprises automatically checking proper functionality of at least one of the at least one load sensor and the transmission device by a) blocking movement of the transmission device by means of the brake device, b) commanding the control surface drive device to apply a load on the blocked transmission device, and c) determining whether at least one load sensor output signal of the at least one load sensor is within a predetermined range.

The health monitoring method can be conducted any time when the control surface is not active.

Preferably, the health monitoring method is part of a performance test routine for other devices of the control surface driving apparatus, for example of a performance test for the brake device and/or of a performance test for an internal brake device within the control surface drive device such as a Power Off Brake (POB).

Preferably, step b) comprises:

b1) sending a load command signal to the control surface drive device corresponding a commanded load to be applied.

Preferably, step b) comprises:

b2) commanding the control surface drive device to apply a rising load on the blocked transmission device.

Preferably, step b) comprises:

b3) commanding a closed-loop controller, configured to control a speed and load of the control surface drive device by a close-loop control, to drive the control surface drive device with a predetermined speed and automatically generating load command signals commanding rising loads by the close-loop controller.

Preferably, step c) comprises:

c1) determining whether a difference between the commanded load and a load corresponding to the at least one load sensor output signal exceeds a predetermined maximum value.

Preferably, step c) comprises:

c2) setting the predetermined range depending on a load command signal.

Preferably, step c) comprises:

c3) ending the determination when the load command signal achieves a predetermined load limit.

Preferably, step c) comprises:

c4) ending the determination when the at least one load sensor output signal achieves a predetermined load limit of a load limiting function of the flight control surface driving apparatus.

Preferably, step c) comprises:

c5) determining whether a commanded load signal generated in step b) is within a predetermined range.

Preferably, the at least one load sensor for sensing a load imposed on the control surface drive device includes a first load sensor for sensing the load imposed on the control surface drive device and a second load sensor for sensing the load imposed on the control surface drive device. Preferably, the health monitoring method checks the functionality of the first load sensor and the functionality of the second load sensor at the same time by conducting step c) on their output signals.

Preferably, the flight control surface driving apparatus to be monitored comprises at least one rotating element for transmitting mechanical power to the at least one control surface, wherein the at least one load sensor is at least one torque sensor for determining a torque on the rotating element. Especially, the rotating element is an output shaft of the control surface drive device. Preferably, the flight control surface driving apparatus comprises a first torque sensor unit (TSU) and a redundant second torque sensor unit (TSU) on each rotating output element of the control surface drive to sense the torque thereon.

Preferably, a failure message signal is issued when step c) leads to the result that the output of the at least on load sensor lies outside an expected range defined by at least one threshold. Preferably, the threshold is set depending on a load command signal. Most advantageous, a load command signal of a closed-loop motor controller is used.

According to another aspect, the invention provides a flight control surface driving apparatus comprising:

a control surface drive device for generating mechanical power for moving at least one control surface, a transmission device for transmitting mechanical power from the control surface drive device to the at least one control surface, at least one brake device for braking movement of the transmission device, at least one load sensor for sensing a load imposed on the control surface drive device, and a control device configured to receive a load sensor output signal from the at least one load sensor and to control the control surface drive device in response to the load sensor output signal, the control device being configured to automatically check proper functionality of the load sensor and/or the transmission device by:

a) blocking movement of the transmission device by means of the brake device, b) commanding the control surface drive device (106) to apply a load on the blocked transmission device, and c) determining whether at least one load sensor output signal of the at least one load sensor is within a predetermined range.

Preferably, the control device is configured to automatically conduct the health monitoring method according to any of the above-mentioned embodiments.

Preferably, the control surface drive device comprises at least one rotating output shaft, and the at least one load sensor comprises at least one torque sensor for sensing a torque on the rotating output shaft.

Preferably, there is at least a first and a second load sensor for sensing torque on an output member of the control surface drive device or on an input member of the transmission device.

Preferably, there is at least a first and a second torque sensor for sensing torque on an input end of an input rotating shaft of the transmission device. Preferably, the first and second torque sensors determine the torque on an output of the control surface drive device connected to the input end.

Preferably, the control surface drive device includes an electric motor controlled by a close-loop controller with regard to speed and torque, wherein the close-loop controller is configured to send a torque command signal commanding gradually rising torque when an output of the electric motor is blocked, wherein the control device is configured to compare the output of the at least one load sensor with the torque command signal.

Preferably, the brake device comprises left-hand and right-hand wing tip brakes acting on an output element of the transmission device arranged near a wing tip.

According to another aspect, the invention provides a flight control system for an aircraft, comprising at least one flight control surface and at least one flight control surface driving apparatus according to any of the above-mentioned embodiments for driving the movement of the at least one flight control surface.

Preferably, the flight control system further comprises left-hand and right-hand series of slats and flaps of a high lift system as the at least one control surface.

Preferably, the at least one load sensor for sensing a load imposed on the control surface drive device includes a first load sensor for sensing the load imposed on the control surface drive device and a second load sensor for sensing the load imposed on the control surface drive device.

Preferably, the flight control system further comprises the first load sensor and a first controller receiving a load sensor output signal of the first load sensor and controlling the movement of the at least one control surface in response to the load sensor output signal of the first load sensor.

Preferably, the flight control system further comprises the second load sensor and a second controller receiving a load sensor output signal of the second load sensor and controlling the movement of the at least one control surface in response to the load sensor output signal of the second load sensor.

According to the invention, the flight control system comprises at least one brake device for braking or blocking movement of the transmission device. Preferably, the brake device has at least one brake element imposing a braking force to an output element of the transmission device. Especially, the braking device is a wing tip brake to be disposed near to a wing tip of the aircraft to be equipped with a slat and/or flap drive system including the flight control surface drive apparatus for driving movements of slats and/or flaps.

Preferably, the control device is configured to compare the load sensor output signal of the at least one load sensor with a predetermined maximum load value in a flight and ground condition and to trigger, when the load sensor output exceeds the predetermined maximum load value, a reverse movement and a subsequent load control sequence for controlling the load to achieve a lower load level.

According to another aspect, the invention provides an aircraft comprising the flight control surface driving apparatus according to any one of the above-mentioned embodiments and/or the flight control system according to any one of the above-mentioned embodiments. Especially, the aircraft has a high-lift system with slats and flaps which are driven by the flight control surface drive apparatus.

According to another aspect, the invention provides a computer program comprising instructions to cause the flight control system of any of the above-mentioned embodiments to execute the steps of the health monitoring method according to any of the above-mentioned embodiments.

Preferred embodiments of the invention propose an automatically performed torque sensor unit health monitoring. Preferred embodiments of the invention provide an automatically performed torque sensor monitoring which can be conducted during operation of an aircraft.

According to preferred embodiments, economy of operation is improved using an automated detection system. While embodiments of the invention are particularly suitable when used in connection with flight control surface driving apparatuses suitable for driving primary flight control surfaces such as ailerons, rudders, etc. or secondary flight control surfaces such as high-lift devices, embodiments of the invention are also applicable to other movable actuated surfaces in an aircraft such as cargo doors, landing gear doors, etc.

BRIEF DESCRIPTION OF THE DRAWINGS

Preferred embodiments of the invention are explained below with reference to the drawings in which.

DETAILED DESCRIPTION OF THE PREFERRED EMBODIMENTS

Figure 1:
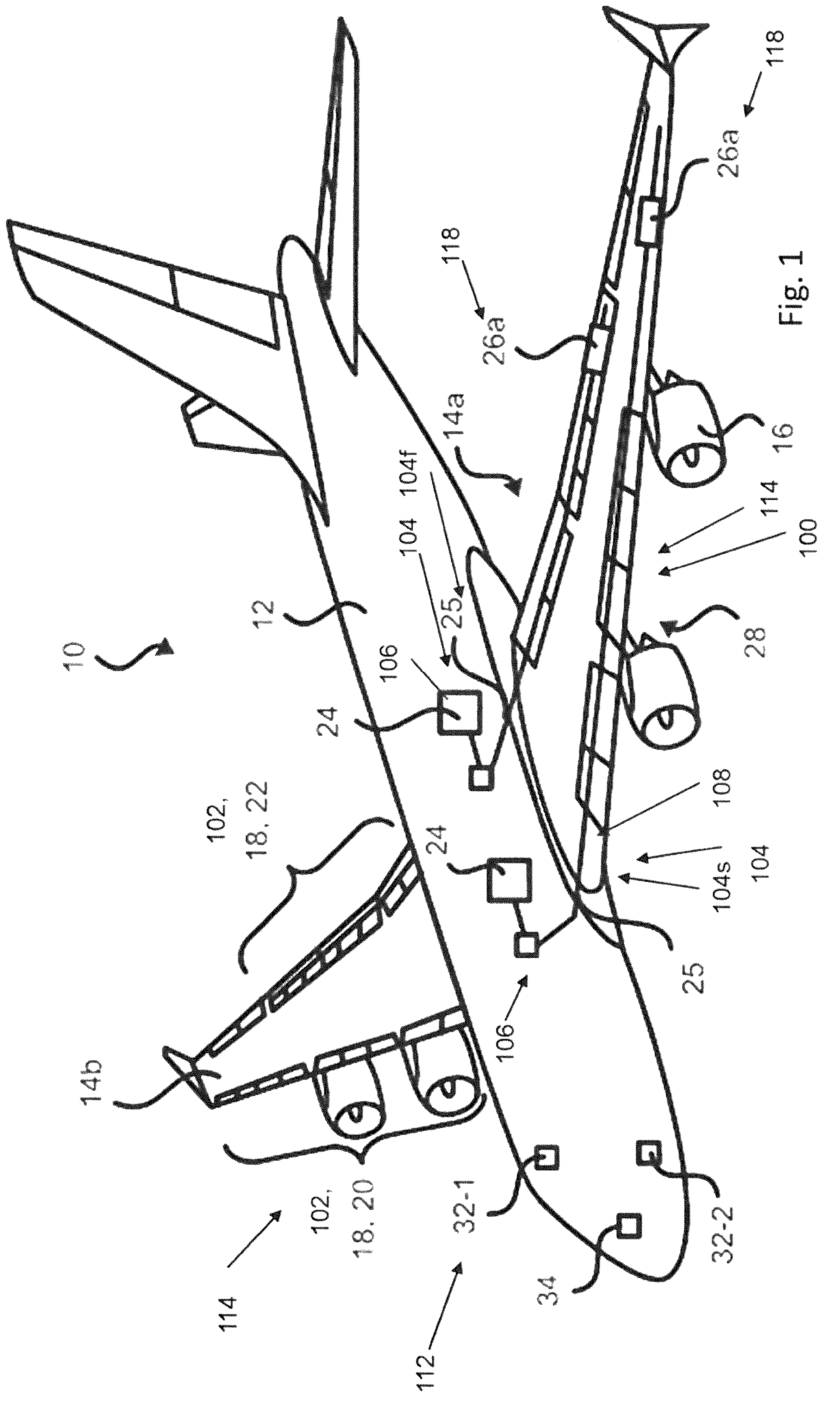
FIG. 1 depicts an embodiment of an aircraft.

Referring to FIG. 1, an aircraft 10 has a flight control system 100 including control surfaces 102 and a flight control surface driving apparatus 104. The flight control surface driving apparatus 104 comprises a control surface drive device 106 for generating mechanical power for the movement of at least one of the control surfaces 102, a transmission device 108 for transmitting mechanical power from the control surface drive device 106 to the at least one of the control surfaces 102, at least one load sensor 110 for sensing a load imposed on the control surface drive device 106, and a control device 112 configured to receive a load sensor output signal from the at least one load sensor 110 and to control the control surface drive device 106 in response to the load sensor output signal. In the embodiment shown, the flight control system 100 includes a high lift system 114 with high-lift devices 18 as control surfaces 102. Several flight control surface driving apparatuses 104, 104*s*, 104*f* are configured to drive associated groups of such high-lift devices 18. The flight control surface driving apparatus 104 further includes a brake device 118 for braking or blocking movement of the transmission device 108.

As further shown in FIG. 1, the aircraft 10 has a fuselage 12. The aircraft 10 also has a pair of wings 14*a*, 14*b* that are attached to the fuselage 12. The aircraft 10 further comprises engines 16 that are attached to the wings 14*a*, 14*b*.

The aircraft 10 has a plurality of said high-lift devices 18, such as slats 20 and flaps 22 which are examples of the control surfaces 102. The high-lift devices 18 are driven by a power control unit or PCU 24 which is an example of the control surface drive device 106. The PCU 24 outputs torque to the transmission device 108 which includes drive shafts 25 that are connected to the high-lift devices 18 in a manner known per se. In order to arrest the high-lift devices 18 in a predetermined position, wing tip brakes (WTB) 26*a*, 26*b* (elements of the brake device 118) are arranged near the end portions of the drive shafts 25.

In more detail, the high-lift system 114 includes, as flight control surface driving apparatuses 104, a slat driving apparatus 104*s* for driving the slats 20 and a flap driving apparatus 104*f* for driving the flaps. Each of these driving apparatuses 104*s*, 104*f* has a centralized PCU 24 mounted in the fuselage. Each PCU 24 is controlled by the control device 112 which includes a first and a second slat flap computer (SFCC) 32-1, 32-2. The first and second slat flap computers 32-1, 32-2 are independent from each other and control and monitor the slat and flap driving apparatuses 104*s*, 104*f* in correspondence with the pilot's operation of an input device 34.

The configurations of the slat and flap driving apparatuses 104*s*, 104*f* are similar and are explained in more detail with reference to the example of the slat driving apparatus 104*s* depicted schematically in FIG. 2.

Figure 2:
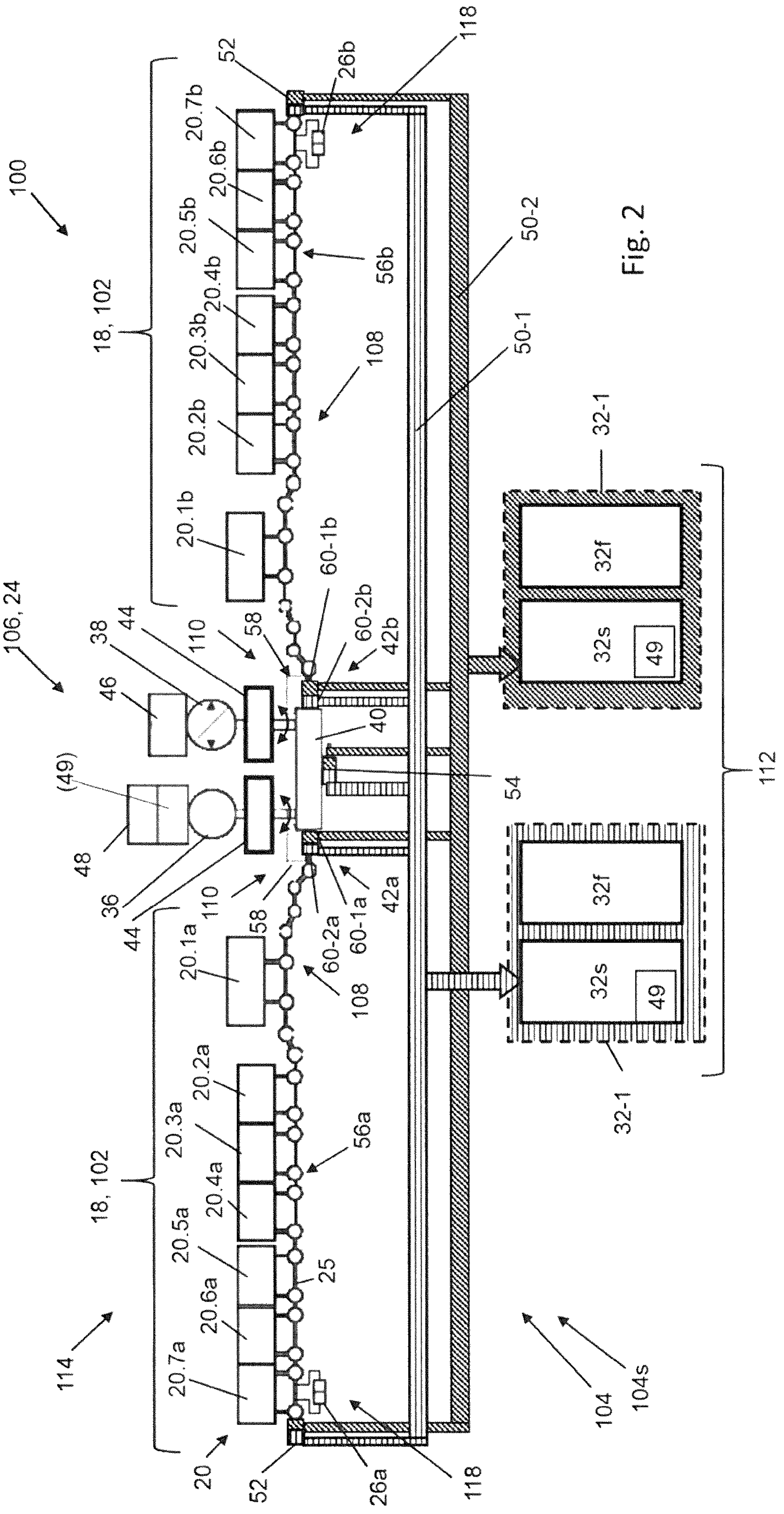
FIG. 2 depicts an embodiment of a part of a flight control system of the aircraft.

Referring now to FIG. 2, first the PCU 24 as an example of the control surface drive device 106 for generating mechanical power for the movement of the slats 20 is described. The PCU 24 has at least two independent motors 36, 38 which are connected by an appropriate gear, for example a speed summing differential gear (DIFG) 40.

The DIFG 40 has a left-hand output shaft 42*a* for driving first to seventh left-hand slats 20.1*a* to 20.7*b* and a right-hand output shaft 42*b* for driving first to seventh right-hand slats 20.1*b* to 20.7*b*. Of course, the number of slats 20 may differ in other embodiments.

Each motor 36, 38 is provided with a Power Off Brake 44 to arrest the motor 36, 38 in the commanded position. Depending on the aircraft power supply system and the availability requirements the PCU 24 is either purely hydraulically or electrically driven or includes an electric motor 36 and a hydraulic motor 38 (hybrid PCU) as shown in the present embodiment. For the electric motor 36, a digitally controlled brushless DC motor may be used and for the hydraulic motor 38 a digitally controlled variable displacement motor may be used and may be controlled by a hydraulic valve block 46. For the electric drive embodying the electric motor 36, a Motor Control Electronic (MCE) 48 is interfacing with the SFCC 32-1, 32-2 and an aircraft electrical busbar 50-1, 50-2. The MCE 48 converts the electric power as required for the brushless DC motor. A motor control for the hydraulic and electric drive is established by a closed loop layout to maintain speed and torque command inputs. The control algorithms are implemented, e.g. by software as computer programs, in the control device 112 (e.g. in each SFCC 32-1, 32-2) which is provided with all required data to control the motors 36, 38. The SFCCs 32-1, 32-2 of the control device 112 control this operation of the flight control surface driving apparatus 104 also in response to output signals of load sensors 110 and position pick-up units 52, 54. The SFCC 32 has a slat control portion 32*s* controlling the operation of the slat driving apparatus 104*s*, and a flap control portion 32*f* controlling the operation of the flap driving apparatus 104*f* which is not shown in FIG. 2. In one embodiment, the MCE 48 comprises a closed-loop controller 49 for controlling speed and torque of the electric motor 36. According to another embodiment, the closed loop controller 49 is implemented as software within the control device 112, e.g. in any of the SFCCs 32-1, 32-2.

The transmission device 108 includes a left-hand torque shaft system 56*a* connected to the left-hand output shaft 42*a* and a right-hand torque shaft system 56*b* connected to the right-hand output shaft 42*b*. Each torque shaft system 56*a*, 56*b* comprises a series of the drive shafts 25, connected to each other for a common rotation. A left-hand WTB 26*a* acts on the last drive shaft 25 of the left-hand torque shaft system 56*a* near the wing tip of the left-hand wing 14*a*, and a right-hand WTB 26*b* acts on the last drive shaft 25 of the right-hand torque system 56*b* near the wing tip of the right-hand wing 14*b*. Further, a position pick-up unit 52 picks up the position (e.g. an absolute rotation angle position) of the corresponding last drive shaft 25.

The load in the transmission of each wing 14*a*, 14*b* is limited by electronic load limiter (ETL) functionality using the at least one load sensor 110. In the embodiment shown, where the mechanical power is transmitted via rotation, the torque in the transmission of each wing 14 is limited by electronic torque limiter functionality. The torque in the torque shaft systems 56*a*, 56*b* of the transmission device 108 is limited by electronic torque sensing units (TSU) 58 including a first torque sensor 60-1*a*, 60-1*b* and a second torque sensor 60-2*a*, 60-2*b* sensing the torque imposed on the corresponding output shaft 42*a*, 42*b* of the POB 24. For example, the TSUs 58 are integrated on the PCU outputs to the left-hand and right-hand wing 14*a*, 14*b*. The left-hand and right-hand first torque sensors 60-la, 60-1*b* are connected to the first SFCC 32-1, and the left-hand and right-hand second torque sensors 60-2*a*, 60-2*b* are connected to the second SFCC 32-2.

If the TSU 58 detects that the torque in one of the PCU output shafts 42*a*, 42*b* exceeds a predetermined over torque threshold, the electrical output signal provided by the TSU 58 triggers a monitor (implemented as computer program in the control device 112) which initiates a rapid speed reversal and torque control sequence subsequently controlling the torque to a lower level. This ensures that the prescribed loads in the transmission device 108 are not exceeded even in case of a jam. Finally, the slat driving apparatus 104*s* is arrested by engaging the POB 44 of the corresponding motor 36, 38.

In the default High Lift operating mode the WTBs 26*a*, 26*b* are released and the PCU 24 is providing the power to operate the high-lift system 114 with the commanded speed into any gated position.

For implementing the load sensor 110, any appropriate load sensing principle is possible. For example, the TSU 58 which replaces mechanical system torque limiters of conventional flight control surface driving apparatuses comprises appropriate mechanical and electrical components to measure the PCU output torque and to translate it into an electrical output signal (e.g. by Linear Variable Transducer (LVDT)).

In the following a health monitoring procedure for checking proper functionality of the transmission device 108 and of the load sensors 110 is described with reference to FIG. 3. The control device 112 contains a corresponding computer program and is configured to command an automatic performance of this functionality check. The functionality check leads to early detection of wear or other possible reasons for beginning deteriorations, improves long-term reliability and helps to avoid unnecessary maintenance work.

Mechanical alterations in the TSU 58 (e.g. wear or other alterations of mechanical components which transfer a torsional deflection of the output shaft 42*a*, 42*b* into a linear motion sensed by electrical sensors) will have influence on the TSU torque value readings.

An example for a TSU condition check is explained in the following with reference to FIG. 3.

Figure 3:
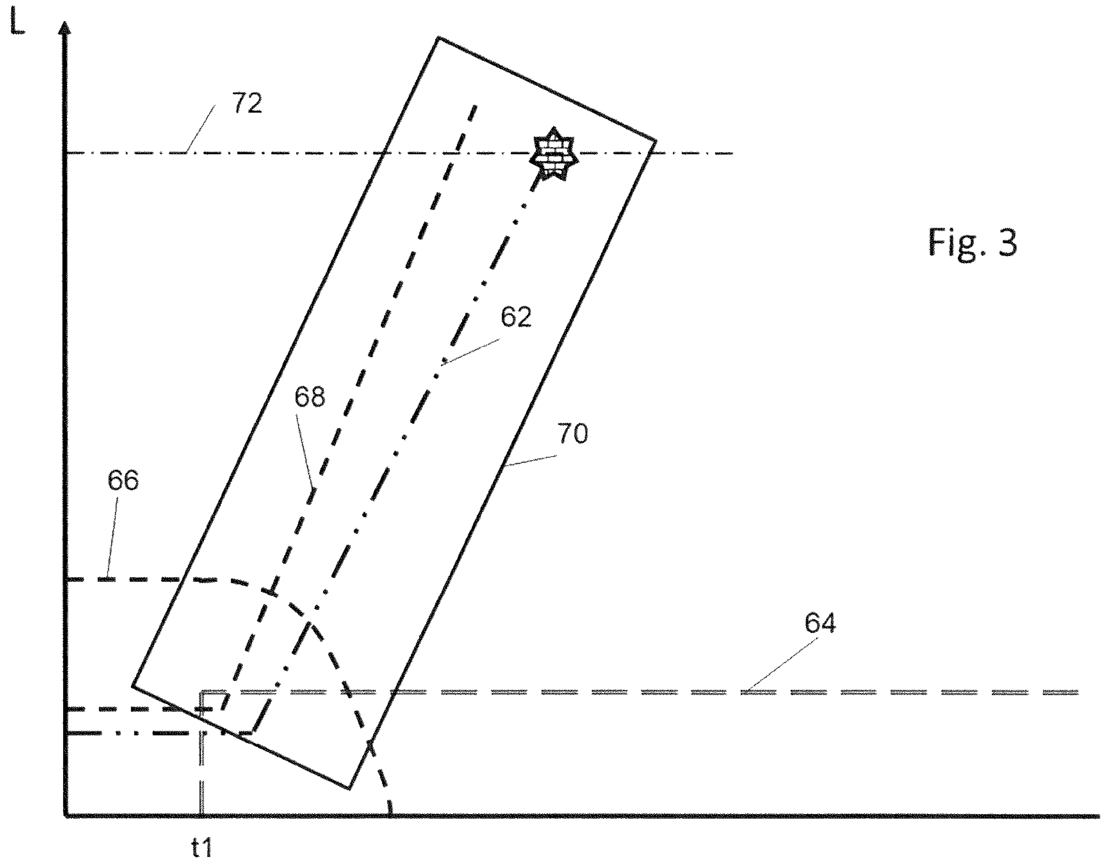
FIG. 3 shows a graph with a load command signal and an output signal of load sensor of the flight control system during a health monitoring procedure.

FIG. 3 shows the following signals over the time t:

a load sensor output signal 62 of the load sensor 110 to be tested, here for example the first torque sensor 60-1*a* on the left-hand output shaft 42*a* of the POB 24.

A brake device command signal 64 for commanding an operation of the brake device 118, here for example a WTB command signal for activating the left-hand WTB 26*a*.

A drive speed signal 66 of the control surface drive device 106, here for example a speed signal indicative of the rotation speed of the output of the POB 24. This speed signal can be derived, for example, from the position pick-up unit 54 at the DIFG 40.

A load command signal 68 commanding a load output from the control surface drive device 106, here preferably a MCE torque command signal outputted from an integral part of the closed-loop controller 49.

a predetermined range 70 for the load sensor output signal 62 and/or the load command signal.

The functionality check of the health monitoring method comprises the following steps:

a) blocking movement of the transmission device 108 by means of the brake device 118, b) commanding the control surface drive device 106 to apply a load on the blocked transmission device, and c) determining whether at least one load sensor output signal 62 of the at least one load sensor 110 is within the predetermined range 70.

Referring to FIG. 3, the WTB engages at time t1. Further, the control surface drive devise 106 receives a command to drive with low speed. After t1, the drive speed signal 66 starts to drop. The closed-loop controller 49 responds by sending a load command signal 68 (MCE torque signal) which rises linearly. Further, since the transmission device 108 is blocked, the load sensor 110 outputs the load sensor output signal 62 which rises linearly. The control device 112 determines whether the load sensor output signal 62 remains in the predetermined range 70. Further, the control device 112 determines whether the load command signal 68 remains in the predetermined range 70. If any of the signals 62, 68 leaves the predetermined range, a failure message is issued. Otherwise, the test is continued until the load sensor output signal reaches the predetermined ETL over torque threshold 72 as mentioned above. According to another embodiment (not shown), the test ends when the load command signal 68 reaches a predetermined load limit, for example a threshold which corresponds to the ETL over torque threshold 72.

FIG. 3 shows for example a TSU integrity check as part of a WTB and/or POB performance test. A preferred embodiment is described in the following in more detail.

As part of the WTB/POB performance test, which is carried out regularly, the following sequence can be used to check the correct function of the TSU 58. The SFCC 32-1, 32-2 commands the electric drive of the PCU 24 with low speed against the engaged WTB 26*a*, 26*b* causing stall of the electric drive. The speed control of the PCU electric drive implemented in the SFCC 32-1, 32-2 is established by a closed speed control loop with an integral part. The output of this speed loop is the MCE torque command signal 68 which correspond to a commanded motor torque. Because of the integral part of the controller 49, the MCE torque command signal 68 steadily increases during the stall condition. As a consequence, with increasing electric motor torque, the torque at the PCU 24 output which is measured by the TSU 58 also increases. The TSU Torque reading—load sensor output signal 62—is compared by the SFCC 32-1, 32-2 to a reference torque value (e.g. MCE torque command signal 68 from the speed loop). When the deviation of these two signals 62, 68 exceeds a defined threshold, the test is aborted and failed. As long as during motor stall both signals following within an acceptable range the motor drive command remains active until a defined threshold 72 is achieved. The test is successfully passed when a defined threshold is achieved (e.g. the ETL trip threshold). The correct function of the TSU 58 is proven when the TSU Torque reading is following the rise of the commanded motor torque signal within an acceptable range until the abort condition is achieved.

In case that the speed loop is implemented in the MCE 48 the corresponding evaluation will be performed in the MCE 48 and the results are sent to the SFCC 32-1, 32-2.

In order to reduce maintenance work and to improve long-time reliability, a health monitoring method has been described for checking a functionality of a flight control surface driving apparatus 104 using at least one load sensor 110 for sensing a load imposed on a control surface drive device 106, the method comprising at least one of the steps:

a) blocking movement of the transmission device 108 by means of a brake device 118, b) commanding the control surface drive device 106 to apply a load on the blocked transmission device, and c) determining whether at least one load sensor output signal 62 of the at least one load sensor 110 is within a predetermined range.

Further, a flight control surface drive apparatus 104, a flight control system 100 and an aircraft 10 comprising a control device 112 configured to automatic command conduct of such health monitoring method have been described.

While the health monitoring has been described in connection with driving flight control surfaces which can be primary and secondary flight control surfaces, the health monitoring could also be applied to other movable surfaces of an aircraft such as cargo doors, landing gear doors, etc.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGNS LIST

10 aircraft
12 fuselage
14*a* left-hand wing
14*b* right-hand wing
16 engine
18 high-lift device
20 slat
20.1*a*-20.7*a* left-hand slats
20.1*b*-20.7*b* right-hand slats
22 flap
24 PCU
25 drive shaft
26*a* left-hand WTB
26*b* right-hand WTB
32-1 first SFCC
32-2 second SFCC
32*s* slat control portion
32*f* flap control portion
34 input device
36 electric motor
38 hydraulic motor
40 DIFG
42*a* left-hand output shaft
42*b* right-hand output shaft
44 POB
46 hydraulic valve block
48 MCE
49 closed-loop controller
50-1 electric busbar
50-2 electric busbar
52 position pick-up unit (output of transmission device)
54 position pick-up unit (DIFG)
56*a* left-hand torque shaft system
56*b* right-hand torque shaft system
58 TSU
60-1*a* left-hand first torque sensor (example for first load sensor)
60-1*b* left-hand first torque sensor (example for first load sensor)
60-2*a* left-hand second torque sensor (example for second load sensor)
60-2*b* left-hand second torque sensor (example for second load sensor)
62 load sensor output signal
64 brake device command signal
66 drive speed signal (actual drive speed)
68 load command signal
70 predetermined range
72 over torque threshold
100 flight control system
102 control surface
104 flight control surface driving apparatus
104*s* slat driving apparatus
104*f* flap driving apparatus
106 control surface drive device
108 transmission device
110 load sensor
112 control device
114 high-lift system
118 brake device
L load, for example torque [Nm]
t time
t1 engagement of WTB starts

The invention claimed is:

1. A method for checking a functionality of a flight control surface driving apparatus comprising a motor for generating mechanical power for moving at least one control surface, a transmission device comprising a shaft for transmitting mechanical power from the motor to the at least one control surface, at least one brake device for braking movement of the shaft, at least one load sensor for sensing a load imposed on the motor, and a control device configured to receive a load sensor output signal from the at least one load sensor and to control the motor in response to the load sensor output signal, wherein the method comprises:

automatically checking proper functionality of at least one of the at least one load sensor and the shaft by:
a) blocking movement of the shaft with the brake device,
b) while blocking movement of the shaft with the brake device, commanding the motor to apply a load on the shaft blocked by the brake device, while
c) determining whether at least one load sensor output signal of the at least one load sensor remains within a predetermined range.

2. The method according to claim 1, wherein step b) comprises at least one or several of:
b1) sending a load command signal to the motor corresponding a commanded load to be applied;
b2) commanding the motor to apply a rising load on the blocked shafter blocked by the break device;
b3) commanding a closed-loop controller, configured to control a speed and load of the motor by a close-loop control, to drive the motor with a predetermined speed and automatically generating load command signals commanding rising loads by the close-loop controller; and, any combination thereof.

3. The method according to claim 1, wherein step c) comprises at least one or several of:
c1) determining whether a difference between the load of b) and a load corresponding to the at least one load sensor output signal exceeds a predetermined maximum value;
c2) setting the predetermined range depending on a load command signal;
c3) ending the determination of c1) when the commanded load signal achieves a predetermined load limit;
c4) ending the determination when the at least one load sensor output signal achieves a predetermined load limit of a load limiting function of the flight control surface driving apparatus;
c5) determining whether a load command signal generated in step b) is within a predetermined range; and, any combination thereof.

4. The method according to claim 1, wherein the flight control surface driving apparatus to be monitored comprises at least one rotating element for transmitting mechanical power to the at least one control surface, wherein the at least one load sensor is at least one torque sensor determining a torque on the rotating element.

5. A non-transitory computer readable media storing a computer program comprising instructions to cause a flight control system to execute the method of claim 1.

6. An apparatus for driving a flight control surface, the apparatus comprising:

a motor for generating mechanical power for moving at least one control surface, a transmission device comprising a shaft for transmitting mechanical power from the motor to the at least one control surface, at least one brake device for braking movement of the shaft, at least one load sensor for sensing a load imposed on the motor, and a control device configured to receive a load sensor output signal from the at least one load sensor and to control the motor in response to the load sensor output signal, the control device being configured to automatically check proper functionality of at least one of the at least one load sensor and the shaft by:

a) blocking movement of the shaft with the brake device, b) while blocking movement of the shaft with the brake device commanding the motor to apply a load on the shaft, while c) determining whether at least one load sensor output signal of the at least one load sensor remains within a predetermined range.

7. The apparatus of claim 6, wherein the motor comprises at least one rotating output shaft, and the at least one load sensor comprises at least one torque sensor for sensing a torque of the rotating output shaft.

8. The apparatus of claim 6, wherein the motor includes an electric motor controlled by a close-loop controller with regard to speed and torque, wherein the close-loop controller is configured to send a torque command signal commanding gradually rising torque when an output of the electric motor is blocked, wherein the control device is configured to compare the output of the at least one load sensor with the torque command signal.

9. The apparatus of claim 6, wherein the brake device comprises left-hand and right-hand wing tip brakes acting on an output element of the transmission device arranged near a wing tip.

10. A flight control system for an aircraft, the flight control system comprising:

at least one flight control surface, and the apparatus according to claim 6 configured to drive the movement of the at least one flight control surface.

11. The flight control system according to claim 10, wherein the at least one control surface comprises a high-lift device.

12. The flight control system according to claim 10, further comprising:

a second load sensor for sensing the load imposed on the motor and a second controller receiving a load sensor output signal of the second load sensor and controlling the movement of the at least one control surface in response to the load sensor output signal of the second load sensor.

13. The flight control system according to claim 10, wherein the control device is configured to compare the load sensor output signal of the at least one load sensor with a predetermined maximum load value in a flight and ground condition and to trigger, when the load sensor output exceeds the predetermined maximum load value, a reverse movement and a subsequent load control sequence for controlling the load to achieve a lower load level.

14. An aircraft comprising:

the flight control system according to claim 10.

* * * * *